US012800517B2

(12) United States Patent
Choi

(10) Patent No.: US 12,800,517 B2
(45) Date of Patent: Nov. 17, 2026

(54) VARIABLE DETECTOR AND IMAGE-CAPTURING APPARATUS COMPRISING THE SAME

(71) Applicant: Vieworks Co., Ltd., Anyang-si (KR)

(72) Inventor: Jungmin Choi, Ansan-si (KR)

(73) Assignee: Vieworks Co., Ltd., Anyang-si (KR)

(*) Notice: Subject to any disclaimer, the term of this patent is extended or adjusted under 35 U.S.C. 154(b) by 188 days.

(21) Appl. No.: 18/785,318

(22) Filed: Jul. 26, 2024

(65) Prior Publication Data

US 2024/0385126 A1 Nov. 21, 2024

Related U.S. Application Data

(63) Continuation of application No. PCT/KR2023/000865, filed on Jan. 18, 2023.

(30) Foreign Application Priority Data

Jan. 27, 2022 (KR) ........................ 10-2022-0011957

(51) Int. Cl.

| | |
|---|---|
| ***G01N 23/04*** | (2018.01) |
| ***G01B 15/04*** | (2006.01) |
| ***G01L 1/22*** | (2006.01) |

(52) U.S. Cl.

CPC ............. *G01N 23/04* (2013.01); *G01B 15/04* (2013.01); *G01L 1/2206* (2013.01); *G01N 2223/633* (2013.01); *G01N 2223/646* (2013.01)

(58) Field of Classification Search

CPC ...................................................... G01N 23/04

See application file for complete search history.

(56) References Cited

U.S. PATENT DOCUMENTS

| | | | | |
|---|---|---|---|---|
| 6,563,120 | B1 * | 5/2003 | Baldwin | G01T 1/203 250/361 R |
| 10,870,047 | B1 | 12/2020 | Kawamoto et al. | |
| 2007/0053498 | A1 * | 3/2007 | Mandelkern | A61B 6/4233 378/189 |
| 2014/0029017 | A1 * | 1/2014 | Lee | G06F 1/1652 356/601 |
| 2020/0194489 | A1 * | 6/2020 | Bert | G01B 7/18 |
| 2024/0134072 | A1 * | 4/2024 | Moon | G01T 1/244 |

FOREIGN PATENT DOCUMENTS

| | | | |
|---|---|---|---|
| EP | 1483545 | B1 | 6/2006 |
| JP | 2003-070776 | A | 3/2003 |
| KR | 10-2010-0043654 | A | 4/2010 |
| KR | 10-2014-0016073 | A | 2/2014 |

* cited by examiner

*Primary Examiner* — Uzma Alam
*Assistant Examiner* — Shun Lee
(74) *Attorney, Agent, or Firm* — Bridgeway IP Law Group, PLLC; Jihun Kim

(57) ABSTRACT

An embodiment provides a detector including a first part including a first housing made of an elastic material, and a detection panel provided in the first housing, a second part connected to the first part and including a second housing made of an inelastic material or a material having higher rigidity than a material of the first housing, a reinforcement part disposed outside the detection panel in a first direction or disposed to surround at least a part of the detection panel, and at least one bending sensor provided on the reinforcement part and configured to change in resistance value as the first part is bent.

18 Claims, 13 Drawing Sheets

(a)

(b)

(a)

(b)

(a)

(b)

(a)

(b)

(a)

(b)

VARIABLE DETECTOR AND IMAGE-CAPTURING APPARATUS COMPRISING THE SAME

CROSS-REFERENCE TO RELATED APPLICATION

This application is a continuation of copending International Application No. PCT/KR2023/000865, filed Jan. 18, 2023, which is incorporated herein by reference in its entirety, and additionally claims priority from Korean Application No. 10-2022-0011957, filed Jan. 27, 2022, which is also incorporated herein by reference in its entirety.

TECHNICAL FIELD

The present invention relates to a variable detector and an image-capturing apparatus including the same, and more particularly, to a variable detector, which is capable of measuring a radius of a test target to be imaged or detecting a change in curvature of the detector, and an image-capturing apparatus including the same.

BACKGROUND ART

A non-destructive testing method refers to a method that inspects materials, performance, states, whether a defect is present, and the like without destroying test targets.

The non-destructive testing method may be used to identify an internal structure or a defect without destroying the test target. For example, the non-destructive testing method may be used to inspect quality of various types of industrial products in industrial sites, identify whether buildings and the like are defective, and identify abrasion/corrosion states.

In case that non-destructive testing is performed by using X-rays among the non-destructive testing methods, a hollow cylindrical object, e.g., a pipe may be used as a test target.

Meanwhile, there is a need for a structure or method capable of easily measuring, without a separate measurement device, a dimension (e.g., a radius or the like) of a test target, an image of which is captured during non-destructive testing. Furthermore, in case that variable detectors are used in medical fields such as mammography, it may be preferable to detect a change in curvature of the variable detector.

DISCLOSURE

Technical Problem

An object of the present invention is to provide a variable detector, which is capable of measuring a radius of a test target to be imaged or detecting a change in curvature of the detector, and an image-capturing apparatus including the same.

Technical Solution

The present invention provides a detector including a first part including a first housing made of an elastic material, and a detection panel provided in the first housing, a second part connected to the first part and including a second housing made of an inelastic material or a material having higher rigidity than a material of the first housing, a reinforcement part disposed outside the detection panel in a first direction or disposed to surround at least a part of the detection panel, and at least one bending sensor provided on the reinforcement part and configured to change in resistance value as the first part is bent.

In the embodiment, the reinforcement part may be divided into at least two parts in the first direction.

In addition, the reinforcement part may include first and second reinforcement parts disposed in the first direction with the detection panel interposed therebetween.

In addition, a position in the first direction of the bending sensor provided on the first reinforcement part and a position in the first direction of the bending sensor provided on the second reinforcement part may be different from each other.

In the embodiment, the reinforcement part may be divided into a plurality of parts in the first direction and a second direction perpendicular to the first direction.

In the embodiment, the reinforcement part may be disposed over at least a part of the first housing and at least a part of the second housing.

In addition, the bending sensor may be provided between the divided parts of the reinforcement part.

In addition, the bending sensor may be provided in a direction in which the divided parts of the reinforcement part are disposed.

In addition, two opposite ends of the bending sensor may be fixed to ends of the divided parts of the reinforcement part.

In addition, the detector may further include: a connection member configured to connect the divided parts of the reinforcement part and formed to surround at least a part of the bending sensor.

In the embodiment, the connection member may include: a vertical connection portion coupled in a direction perpendicular to a direction of the divided parts of the reinforcement part; and a horizontal connection portion connected to the vertical connection portion and disposed in the direction of the divided parts of the reinforcement part.

In the embodiment, the connection member may include: a first connection portion configured to connect the divided parts of the reinforcement part in one direction of the bending sensor with the bending sensor interposed therebetween; and a second connection portion configured to connect the divided parts of the reinforcement part in the other direction of the bending sensor.

The first connection portion and the second connection portion may be disposed symmetrically on the same plane as or a plane parallel to the detection panel.

In the embodiment, the reinforcement part may include a pair of horizontal reinforcement members formed symmetrically on the same plane as or a plane parallel to the detection panel, and the bending sensor may be provided between the horizontal reinforcement members.

The reinforcement part may have a protruding portion protruding between the horizontal reinforcement members, and the bending sensor may be coupled to the protruding portion, such that the bending sensor is provided between the horizontal reinforcement members.

The present invention provides an image-capturing apparatus, which captures an image by emitting radioactive rays, the image-capturing apparatus including: the above-mentioned detector; a fixing part configured to fix the detector so that the detector is tightly attached to the test target; and a radius measurement part configured to calculate a radius of a test target or a curvature of the detector by using a resistance value of the bending sensor provided in the detector when the detector is tightly attached to the test target and bent.

In the embodiment, a control part may be provided in the second part, disposed in the second housing, and connected to the detection panel.

The control part may be connected to an end of a conductive wire part connected to the bending sensor along the reinforcement part.

In addition, the radius measurement part may be provided in the second part and connected to the control part in a wired manner, or the radius measurement part may be provided outside the detector and connected to the control part in a wired or wireless manner.

The image-capturing apparatus may further include: a radioactive ray generation part configured to emit radioactive rays to the test target, in which the radioactive ray generation part is positioned outside the test target or inside the test target.

In the embodiment, the control part may accumulate the number of uses of the detector by using the resistance value of the bending sensor.

In the embodiment, the control part may increase the number of uses when the resistance value of the bending sensor exceeds a reference value.

In the embodiment, the control part may adjust the amount of increase in number of uses on the basis of the resistance value of the bending sensor.

Advantageous Effects

According to the detector of the present invention, the radius of the test target to be imaged may be accurately recognized when the first part made of an elastic material is tightly attached to the test target and the bending sensor is bent. Therefore, it is possible to correct an image distortion, which may occur when an image of the test target is acquired, or to estimate an accurate thickness of a crack occurring in the test target.

In addition, according to the present invention, the change in curvature of the variable detector may be easily detected by measuring the degree to which the variable detector is bent.

In addition, according to the present invention, it is possible to easily recognize the number of uses or period of use of the variable detector.

MODE FOR INVENTION

Figure 1:
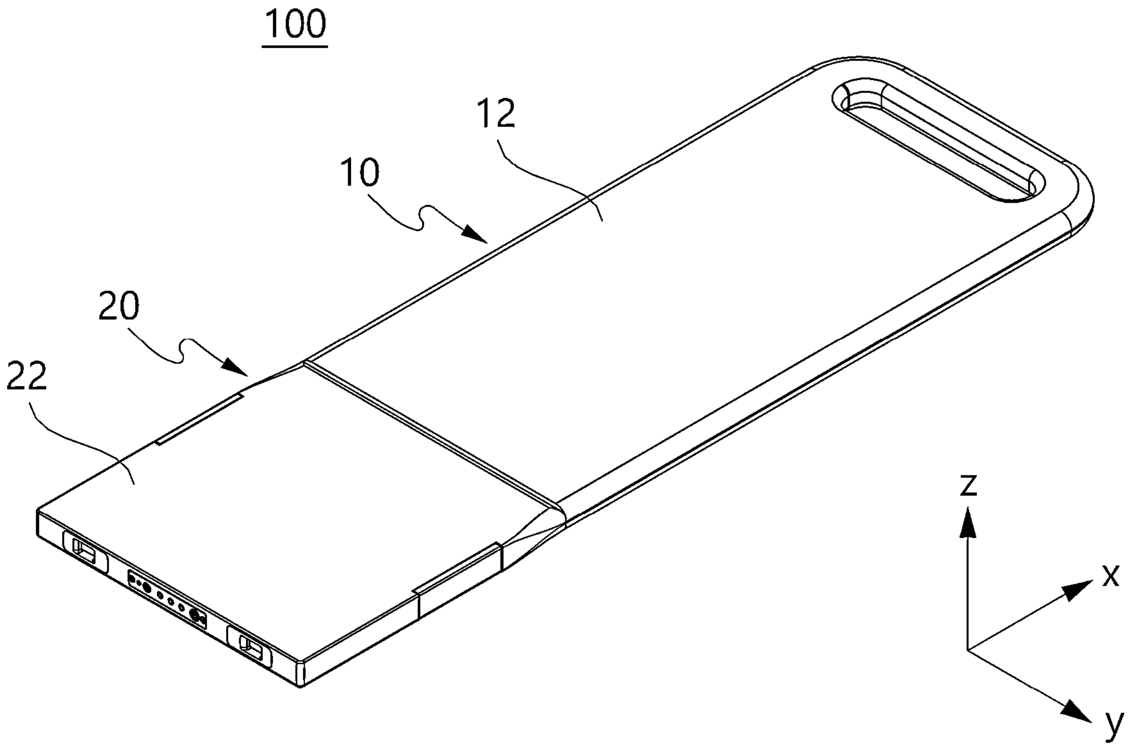
FIG. 1 is a view illustrating an exemplary shape of a detector according to an embodiment of the present invention.

Hereinafter, exemplary embodiments of the present invention will be described in detail with reference to the accompanying drawings. First, in assigning reference numerals to constituent elements of the respective drawings, it should be noted that the same constituent elements will be designated by the same reference numerals, if possible, even though the constituent elements are illustrated in different drawings. In addition, in the description of the present invention, the specific descriptions of publicly known related configurations or functions will be omitted when it is determined that the specific descriptions may obscure the subject matter of the present invention. Further, the exemplary embodiments of the present invention will be described below, but the technical spirit of the present invention is not limited thereto and may of course be modified and variously carried out by those skilled in the art.

Figure 2:
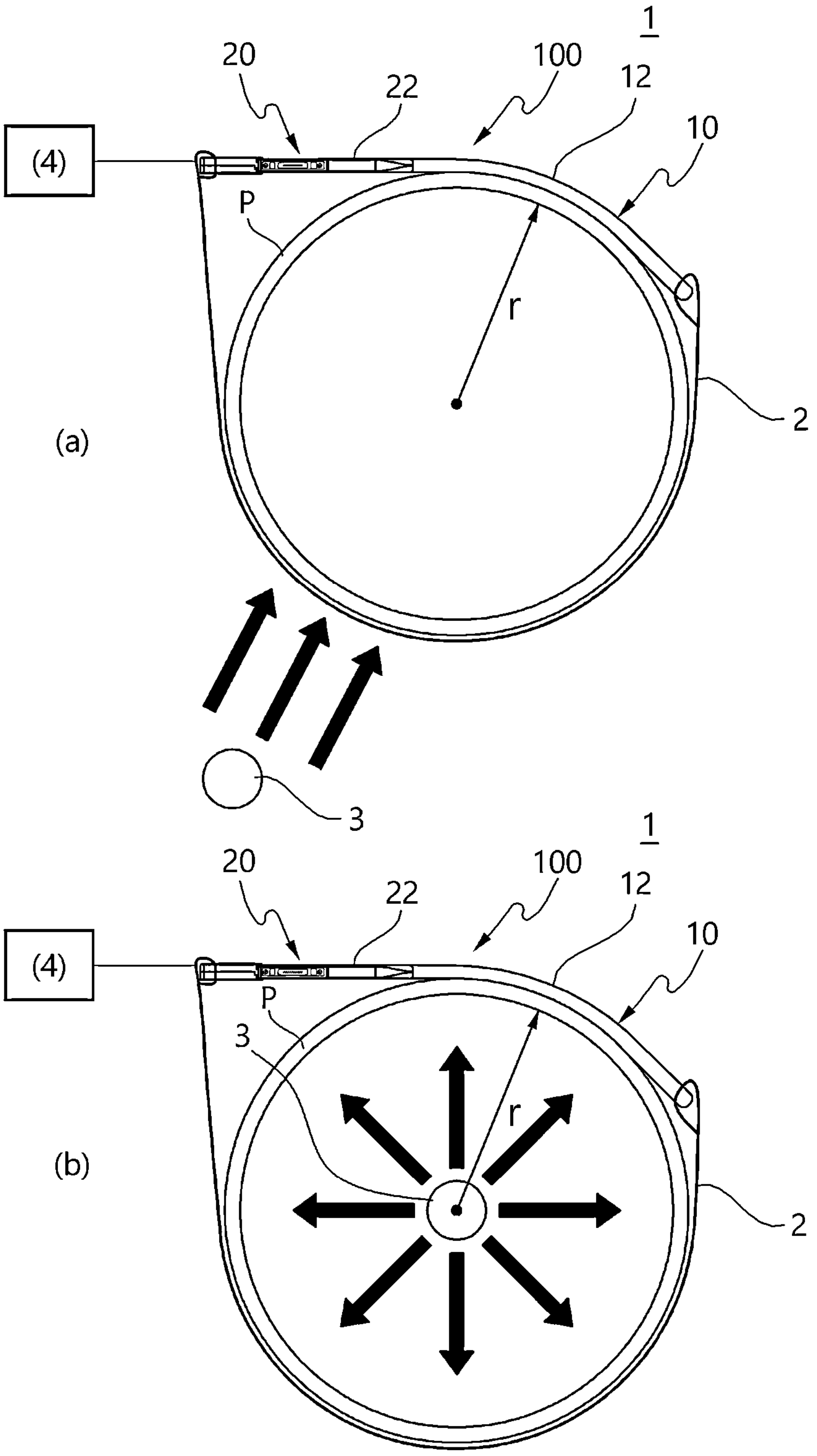
FIG. 2 is a view exemplarily illustrating an image-capturing apparatus including the detector according to the embodiment of the present invention.
Figure 3:
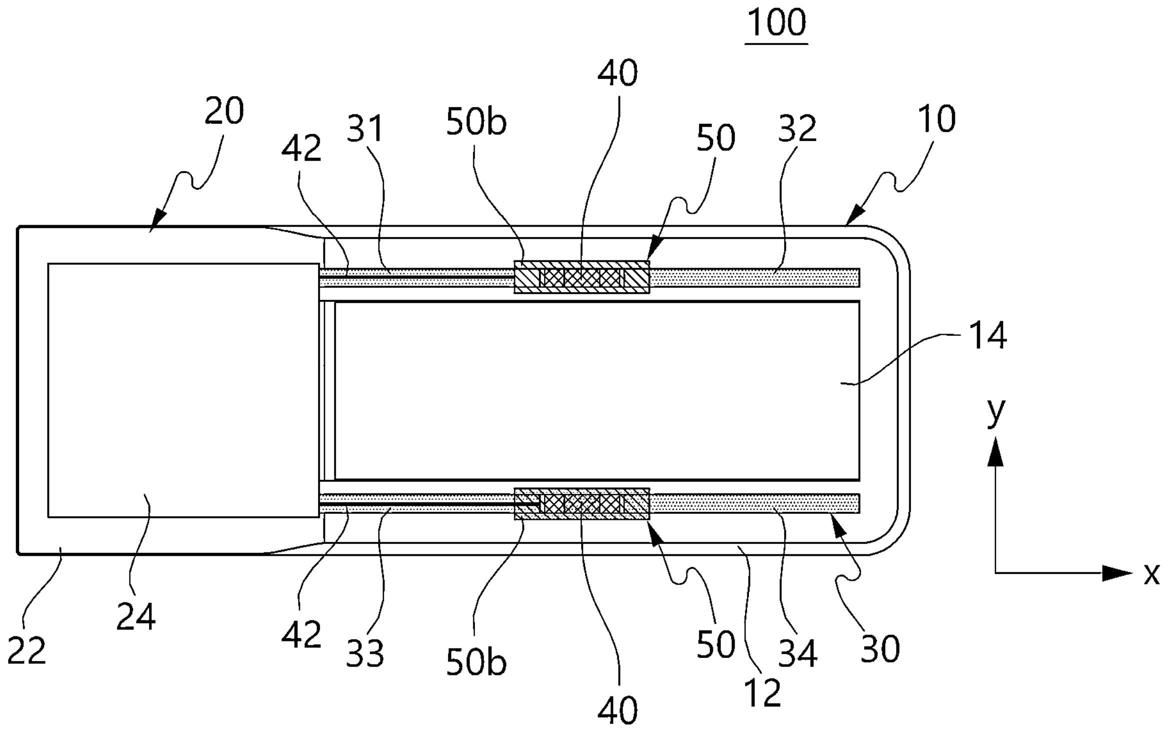
FIG. 3 is a view illustrating the detector according to the embodiment of the present invention when an interior of the detector is projected from above.
Figure 4:
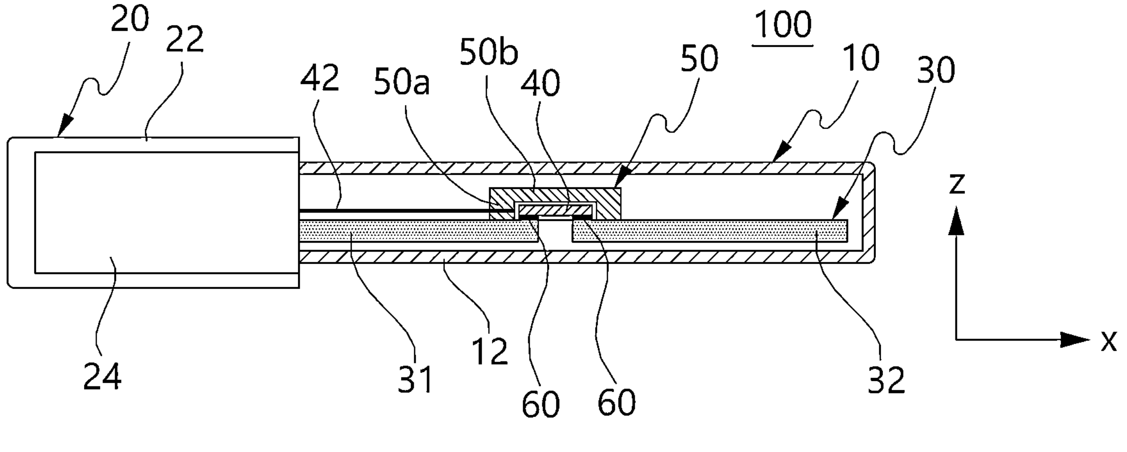
FIG. 4 is a view illustrating the detector according to the embodiment of the present invention when the interior of the detector is projected laterally.

FIG. 1 is a view illustrating an exemplary shape of a detector 100 according to an embodiment of the present invention, FIG. 2 is a view exemplarily illustrating an image-capturing apparatus 1 including the detector 100 according to the embodiment of the present invention, FIG. 3 is a view illustrating the detector 100 according to the embodiment of the present invention when an interior of the detector 100 is projected from above, and FIG. 4 is a view illustrating the detector 100 according to the embodiment of the present invention when the interior of the detector 100 is projected laterally. In this case, part (a) of FIG. 2 is a view illustrating a state in which a radioactive ray generation part 3 is disposed outside a test target P, and part (b) of FIG. 2 is a view illustrating a state in which the radioactive ray generation part 3 is disposed inside the test target P.

In the following embodiment, an X-axis direction indicates a first direction (longitudinal direction), a Y-axis direction indicates a second direction (width direction) perpendicular to the first direction, and a Z-axis direction indicates a vertical direction (thickness direction) perpendicular to both the first and second directions.

In addition, an X-Y plane defined by the X-axis and the Y-axis indicates a horizontal plane, and an X-Z plane defined by the X-axis and the Z-axis indicates a vertical plane.

With reference to FIGS. 1 to 4, the detector 100 according to the embodiment of the present invention includes a first part 10, a second part 20, reinforcement parts 30, and bending sensors 40.

The detector 100 may refer to a device configured to obtain image information by converting light (visible light), which is emitted from a fluorescent material (e.g., a scintillator), into electric signals (electric charges) in response to radioactive rays (X-rays, gamma rays, etc.) that penetrate the test target P. However, the detector 100 is not limited thereto. The detector 100 may be a detector using a direct conversion method that converts incident radioactive rays directly into electrical signals without a separate fluorescent material.

The first part 10 may include a first housing 12 and a detection panel 14 provided in the first housing 12.

The first housing 12 may be made of a radioactive permeable material and made of an elastic material that is changeable in shape. For example, the first housing 12 may be made of rubber, urethane, silicone, carbon composite materials, plastic, or the like that may transmit radioactive rays and be changeable in shape.

The detection panel 14 may be made of a flexible material. For example, the detection panel 14 may be a variable flexible thin film transistor (TFT) and obtain image information by converting light, which is emitted from the fluorescent material, into electric signals (electric charges) in response to radioactive rays that penetrate the test target.

Although not illustrated, the detection panel 14 may include a readout IC (ROIC) sensor provided in the form of a chip-on-film (COF), and a gate sensor. The ROIC sensor and the gate sensor may each be made of a variable material or have a variable structure.

The second part 20 includes a second housing 22 connected to the first part 10 (specifically, the first housing 12).

The second housing 22 may be made of an inelastic material or a material having higher rigidity than the material of the first housing 12. For example, the second housing 22 may be made of a metallic material, such as aluminum, stainless steel, and magnesium, or made of an inelastic carbon composite material or the like. In this case, the second part 20 may further include a control part 24 disposed in the second housing 22 and connected to the detection panel 14. The second housing 22 may accommodate the control part 24 therein and protect the control part 24 from an external impact. For example, the control part 24 may include components such as a printed board assembly (PBA) or a battery that does not change in shape.

For example, in case that the second housing 22 is made of a metallic material, the second housing 22 may protect the control part 24 or the like, which cannot be changed in shape, from an external impact and block noise generated in the control part 24 or introduced from the outside. In addition, the second housing 22 may be made of plastic containing fiberglass.

In the embodiment of the present invention, the second housing 22 does not change in shape. However, the present invention is not limited thereto. Like the first housing 12, the second housing 22 may be made of an elastic material changeable in shape. In addition, in the embodiment, the second housing 22 may be made of a material higher in strength than the material of the first housing 12 so that the second housing 22 is less deformed than the first housing 12.

Meanwhile, although not illustrated, the second part 20 may further include an interface part having a user button configured to perform a function for a user's manipulation convenience, and a communication part configured to perform a function of transmitting data between the detector 100 and a detector external device (a display or the like).

The reinforcement part 30 may be provided outside the detection panel 14 and disposed in parallel with the detection panel 14 in the first direction on the horizontal plane. Alternatively, the reinforcement part 30 may be disposed to surround at least a part of the detection panel 14 on the horizontal plane. That is, the reinforcement part 30 may be provided outside an end of the detection panel 14 and disposed in parallel with the detection panel 14 in the first direction on the horizontal plane. Alternatively, the reinforcement part 30 may be provided outside the end of the detection panel 14 and disposed in a shape that surrounds the detection panel 14.

In the embodiment of the present invention, the reinforcement part 30 may be disposed to overlap the detection panel 14. However, with this arrangement, the reinforcement part 30 may affect an image created by the detection panel 14. Therefore, the reinforcement part 30 may be disposed outside the detection panel 14.

In addition, the reinforcement part 30 may be disposed over at least a part of the first housing 12 and at least a part of the second housing 22. The reinforcement part 30 may allow the detector 100 to be stably bent and assist in restoring the detector 100 to a flat plate shape in the state in which the detection panel 14 is disposed in the first housing 12 and the second housing 22.

In the embodiment, the reinforcement part 30 may have a harder material than the first housing 12. For example, the reinforcement part 30 may be configured by a spring steel sheet or a metal plate or made of rubber, urethane, silicone, carbon composite materials, plastic, and the like harder than the material of the first housing 12.

The detector 100 according to the embodiment of the present invention may include the reinforcement part 30 disposed over the first housing 12 and the second housing 22, in addition to the first part 10 including the first housing 12 (elastic housing) made of a variable elastic material, and the second part 20 including the second housing 22 (inelastic housing) made of an inelastic material or a material having higher rigidity than the material of the first housing 12.

The above-mentioned configuration may prevent damage to the first housing 12 and the detection panel 14 by suppressing excessive deformation of the first housing 12 and the detection panel 14 in case that the first part 10 changes in shape while coming into contact with the test target P.

In addition, in case that the first part 10 changes in shape, the first part 10 may be prevented from being rapidly bent or folded by an external impact. In case that a radiographic inspection is not performed, the first part 10 may be immediately unfolded.

With reference to FIG. 2, the image-capturing apparatus 1 includes the detector 100, a fixing part 2, and the radioactive ray generation part 3. In FIG. 2, an r direction means a radial direction of the test target P. The radioactive rays emitted from the radioactive ray generation part 3 may penetrate the test target P and reach the detector 100. In this case, the test target P may be a welded structure such as a pipe. However, the present invention is not limited thereto. Any structure may be applied as a test target as long as the structure has a curved surface (e.g., a spherical shape or the like).

As exemplarily illustrated in FIG. 2, one end of the fixing part 2 may be coupled to the first part 10 of the detector 100, and the other end of the fixing part 2 may be coupled to the second part 20 of the detector 100, such that the detector 100 may be tightly attached and fixed to the test target P. For example, the fixing part 2 may be configured as a band, a strip, a wire, a belt, a ratchet belt, an iron chain, a Velcro fastener, and the like.

As illustrated in part (a) of FIG. 2, the radioactive ray generation part 3 may be disposed outside the test target P. As illustrated in part (b) of FIG. 2, the radioactive ray generation part 3 may be disposed inside the test target P.

As illustrated in FIG. 2, in the detector 100, the first part 10 made of an elastic material may be tightly attached to the test target P, such that the shape of the first part 10 may be changed to a curved shape. However, the second part 20, which is made of an inelastic material or a material having higher rigidity than the material of the first housing 12, may not change in shape.

As illustrated in FIG. 2, the detector 100 is tightly attached to the test target P. Therefore, in case that the first part 10 changes in shape, the reinforcement part 30 may prevent the first part 10 from being rapidly bent or folded by an external impact. In case that a radiographic inspection is not performed, the reinforcement part 30 may immediately unfold the first part 10.

With reference to FIGS. 3 and 4, the detector 100 according to the embodiment of the present invention further includes at least one bending sensor 40 provided on the reinforcement part 30 and configured to change in resistance value as the first part 10 is bent. For example, the bending sensor 40 may be bent in the same way as the first part 10 when the first part 10 is bent. With the basic configuration, the bending sensor 40 may be attached to the reinforcement part 30, and a degree to which the detector 100 is bent may be detected as the bending sensor 40 is also deformed as the reinforcement part 30 is bent. The reinforcement part 30 may be provided as a single structure provided in at least one direction without being divided. Alternatively, the reinforcement part 30 may be provided as a divided structure, as described below.

With reference to FIGS. 3 and 4, the detector 100 according to the embodiment of the present invention may further include conductive wire parts 42 connected to the bending sensors 40 along the reinforcement parts 30 (e.g., along upper surfaces of the reinforcement parts 30). The control part 24 may be connected to ends of the conductive wire parts 42.

Therefore, the control part 24 may acquire a resistance value of the bending sensor 40 when the first part 10 is bent.

One side and the other side of the bending sensor 40 based on the first direction may be coupled to the reinforcement part 30 by means of coupling members 60. For example, a quick-drying bonding agent, epoxy, silicone, a hot-melt adhesive, an acrylic-based bonding agent, a urethane-based bonding agent, or the like may be used as the coupling member 60. Alternatively, a double-sided or single-sided tape may be used as the coupling member 60. In addition, a mechanical element, such as a bolt or rivet, may be used as the coupling member 60 as long as the mechanical element is configured to couple the bending sensor 40 to the reinforcement part 30.

In addition, in order to couple the bending sensor 40 to the reinforcement part 30, a groove in which the bending sensor 40 is seated, may be formed in a rim surface of an end side of the reinforcement part, such that the bending sensor 40 may be seated in the groove. A bonding agent or the like may be applied in the groove. In another embodiment, an insertion hole, into which the bending sensor 40 is to be inserted, may be formed in a surface of the end of the reinforcement part 30 and has a predetermined depth, and the bending sensor 40 may be inserted into the insertion hole. A bonding agent or the like may be applied in the insertion hole.

With reference to FIGS. 3 and 4, in the detector 100 according to the embodiment of the present invention, the reinforcement part 30 may be divided into at least two parts in the first direction. In addition, the bending sensor 40 may be provided in the first direction between the divided parts of the reinforcement part 30.

In the embodiment, as illustrated in FIGS. 3 and 4, the reinforcement parts 30 may include a first reinforcement part 30A and a second reinforcement part 30B disposed in parallel with the first direction (x-axis direction) on the horizontal plane with the detection panel 14 interposed therebetween.

In addition, as illustrated in FIGS. 3 and 4, the bending sensors 40, may be respectively provided on the first and second reinforcement parts 30A and 30B in the first direction.

The first reinforcement part 30A may be divided into a first reinforcement member 31 and a second reinforcement member 32, and the second reinforcement part 30B may be divided into a third reinforcement member 33 and a fourth reinforcement member 34. The bending sensor 40 may be provided on a connection portion between the first reinforcement member 31 and the second reinforcement member 32, and the bending sensor 40 may also be disposed on a connection portion between the third reinforcement member 33 and the fourth reinforcement member 34.

However, unlike the embodiment illustrated in FIGS. 3 and 4, the reinforcement parts 30 may not be provided as the pair of first and second reinforcement parts 30A and 30B provided at two opposite sides of the detection panel 14, but only any one of the first reinforcement part 30A and the second reinforcement part 30B may be provided. The first reinforcement part 30A and the second reinforcement part 30B may be identical in configuration to each other. The following description of the first reinforcement part 30A described as being the reinforcement part 30 may be equally applied to the second reinforcement part 30B.

The detector 100 according to the embodiment of the present invention further includes at least one connection member 50 configured to connect the divided parts of the reinforcement part 30 and formed to surround at least a part of the bending sensor 40.

For example, a material of the connection member 50 may be identical to or different from the material of the reinforcement part 30. However, the material of the connection member 50 is not limited thereto. In addition, the connection member 50 may be approximately identical in strength to the reinforcement part 30. However, the strength of the connection member 50 may be lower or higher than the strength of the reinforcement part 30. The connection member 50 may be bent in conjunction with the first part 10 and the bending sensor 40 when the first part 10 and the bending sensor 40 are bent.

With reference to FIGS. 3 and 4, the connection member 50 may be formed to surround at least one side of the bending sensor 40.

In the embodiment, the connection member 50 may be provided in an approximate "⊏" shape that surrounds the bending sensor 40. The connection member 50 may include vertical connection portions 50_a_ coupled to the first reinforcement member 31 and the second reinforcement member 32 in the vertical direction, and a horizontal connection portion 50_b_ configured to connect the vertical connection portion 50_a_ and disposed in the same direction as the bending sensor 40. In the embodiment of the present invention, the connection member 50 may have various shapes as long as the connection member 50 has a shape that connects the first reinforcement member 31 and the second reinforcement member 32 and surrounds at least one side of the bending sensor 40. For example, the connection member 50 may have an arc shape.

In the embodiment of the present invention, the connection member 50 connects the divided parts of the reinforcement part 30 on which the bending sensor 40 is provided, and the connection member 50 is formed to surround a part of the bending sensor 40, which may prevent damage to the bending sensor 40 when the first part 10 is bent. In addition, the connection member 50 and the bending sensor 40 may adopt the same structure even in case that a length of the detection panel 14 changes or a length of the reinforcement part 30 changes.

Figure 5:
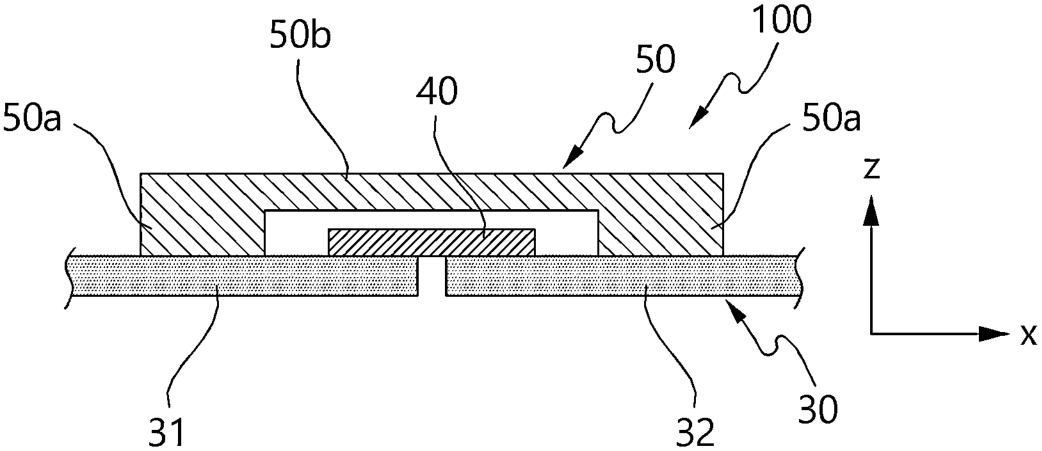
FIG. 5 is a view illustrating states made before and after the detector according to the embodiment of the present invention is bent.
Figure 5:
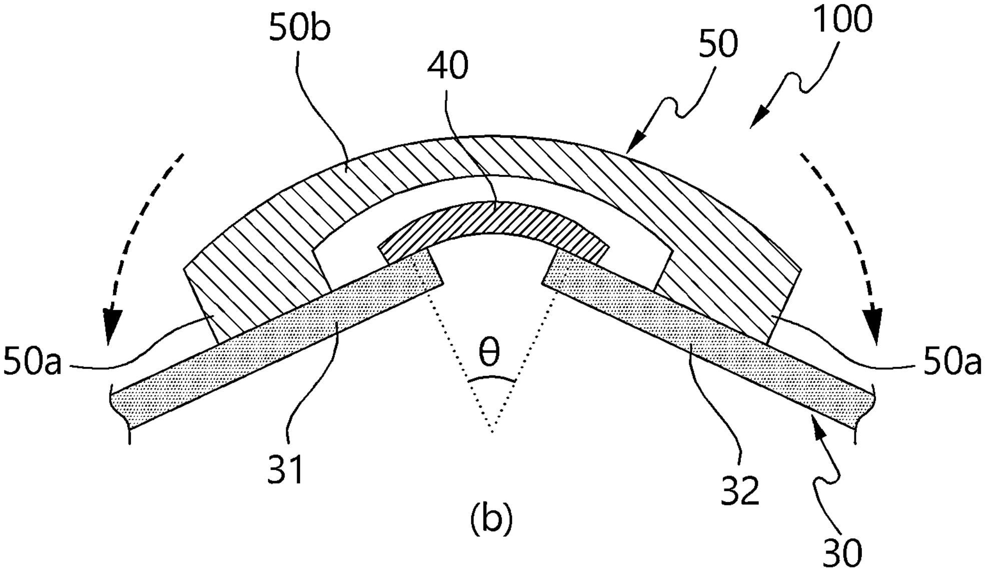

FIG. 5 is a view illustrating states made before and after the detector 100 according to the embodiment of the present invention is bent. In this case, FIG. 5 does not illustrate the conductive wire part 42 and the coupling member 60.

As in the state in part (b) of FIG. 5 from an initial state in part (a) of FIG. 5, the bending sensor 40 and the connection member 50 may be bent as the first part 10 of the detector 100 is bent. Part (b) of FIG. 5 illustrates that a change in curvatures of the bending sensor 40 and the connection member 50 is larger than a change in curvatures of the first reinforcement member 31 and the second reinforcement member 32. However, the change in curvature of the reinforcement part 30 may further increase depending on the material of the reinforcement part 30 and the material of the connection member 50. In some instances, the reinforcement part 30, the connection member 50, and the bending sensor 40 may change to have approximately the same curvature.

For example, in case that the first part 10 is bent in one direction, an angle between the ends of the bending sensor 40 with respect to a center of the test target P based on a radial direction may be θ.

Figure 6:
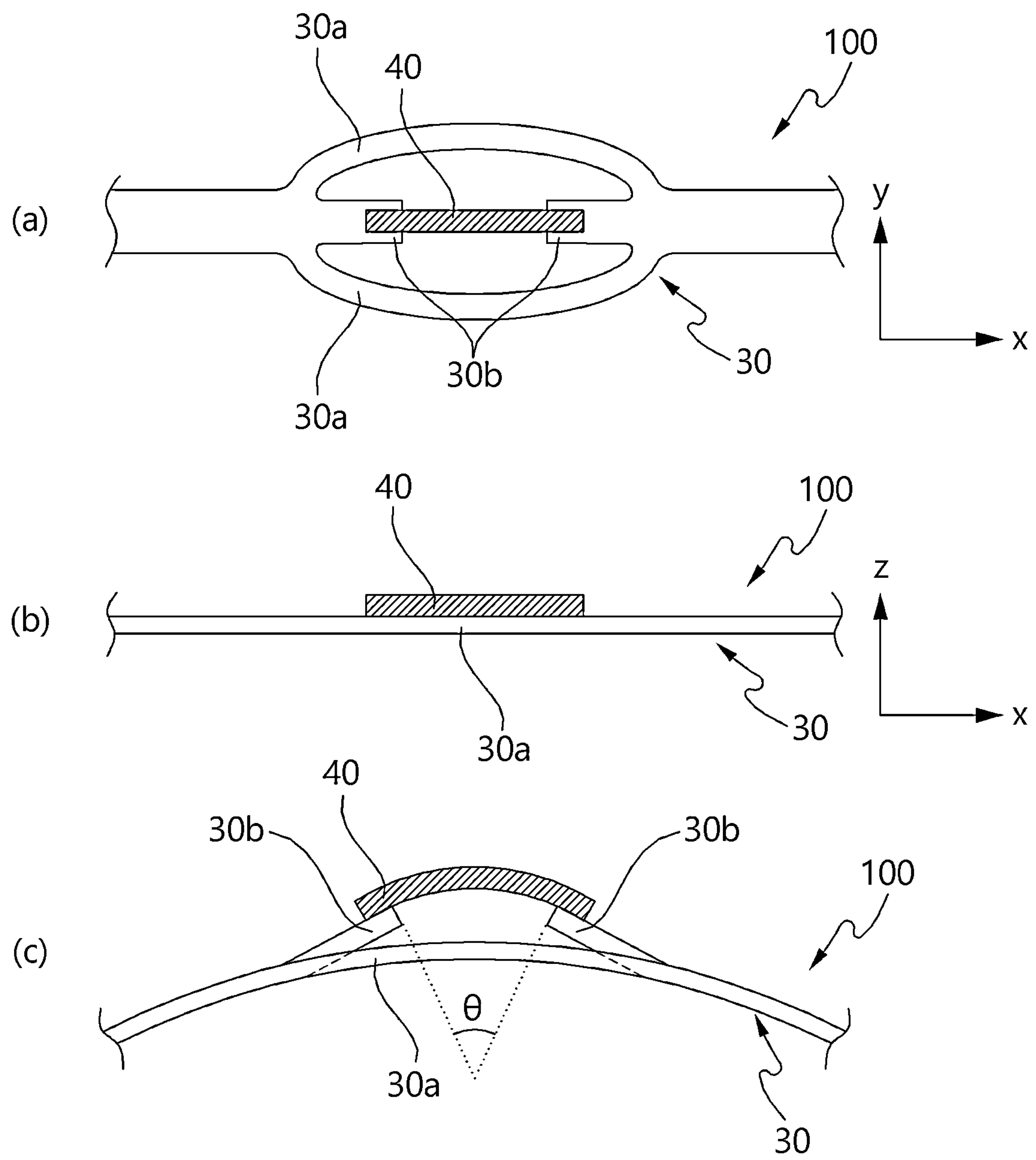
FIG. 6 is a view illustrating another embodiment of a reinforcement part provided in the detector according to the embodiment of the present invention.

FIG. 6 is a view illustrating another embodiment of the reinforcement part 30 provided in the detector 100 according to the embodiment of the present invention. In detail, part (a) of FIG. 6 is a view illustrating a configuration of another embodiment of the reinforcement part 30 provided in the detector 100 when viewed from above, and part (b) and part (c) of FIG. 6 are views illustrating states made before and after the detector 100 is bent.

In this case, FIG. 6 does not illustrate the conductive wire part 42 and the coupling member 60.

In the embodiment illustrated in FIG. 6, the detector 100 may not have a separate connection member 50, unlike the detector 100 illustrated in FIGS. 3 and 4.

In detail, the reinforcement part 30 may include a pair of horizontal reinforcement members 30_a_ formed to be symmetric with respect to the second direction with the bending sensor 40 interposed therebetween on the horizontal plane. In addition, in the embodiment, the reinforcement part 30 may have protruding portions 30_b_ protruding in the first direction between the pair of horizontal reinforcement members 30_a_, and the bending sensor 40 may be positioned in the first direction between the protruding portions 30_b_ disposed at two opposite sides. In addition, in the embodiment of the present invention, the protruding portion 30_b_ may not be separately provided, and the bending sensor 40 may be provided on a portion where the pair of horizontal reinforcement members 30_a_ are separated.

The horizontal reinforcement members 30_a_ may be formed to surround the bending sensor 40 on the horizontal plane, thereby preventing damage to the bending sensor 40 when the first part 10 is bent.

Although not illustrated in detail, in the embodiment illustrated in FIG. 6, the reinforcement part 30 may be provided as a pair of reinforcement parts 30 formed at two opposite sides of the detection panel 14 with the detection panel 14 interposed therebetween on the horizontal plane.

As in the state in part (c) of FIG. 6 from an initial state in part (b) of FIG. 6, in case that the bending sensor 40 is bent as the first part 10 is bent, the horizontal reinforcement members 30_a_ may be bent, and the pair of divided protruding portions 30_b_ may be relatively less bent than the horizontal reinforcement members 30_a_ and the bending sensor 40 and support the bending sensor 40 and the horizontal reinforcement members 30_a_ against the bending of the bending sensor 40 and the horizontal reinforcement members 30_a_. However, part (c) of FIG. 6 merely illustrates an example of a state in which the first part 10 is bent. An actual shape in which the first part 10 is bent may, of course, vary depending on a material of the reinforcement part 30, strain rates of the bending sensor 40 and the reinforcement part 30, and whether the protruding portion 30_b_ is provided.

In addition, because the reinforcement part 30 illustrated in FIG. 6 is formed to surround the bending sensor 40 on the horizontal plane, the control part 24 may acquire an accurate resistance value of the bending sensor 40 not only in a case in which the bending sensor 40 is bent convexly upward, as illustrated in part (c) of FIG. 6, but also in a case in which the bending sensor 40 is bent convexly downward.

In the embodiment of the present invention, a width in the y-axis direction or a thickness in the z-axis direction of the horizontal reinforcement member 30_a_ may be appropriately selected depending on a width and thickness of the reinforcement part 30 that does not have the horizontal reinforcement member 30_a_, such that the width in the y-axis direction or the thickness in the z-axis direction of the horizontal reinforcement member 30_a_ may be mutually and appropriately adjusted so that the bending sensor 40 and the horizontal reinforcement members 30_a_ may be naturally bent when the first part 10 is bent.

Meanwhile, instead of the horizontal reinforcement members 30_a_ formed to surround the bending sensor 40 on the horizontal plane, the reinforcement part 30 illustrated in FIG. 6 may include a vertical reinforcement member (not illustrated) formed to surround the bending sensor 40 on the vertical plane and having a structure similar to that of the connection member 50 illustrated in FIGS. 3 and 4.

Figure 7:
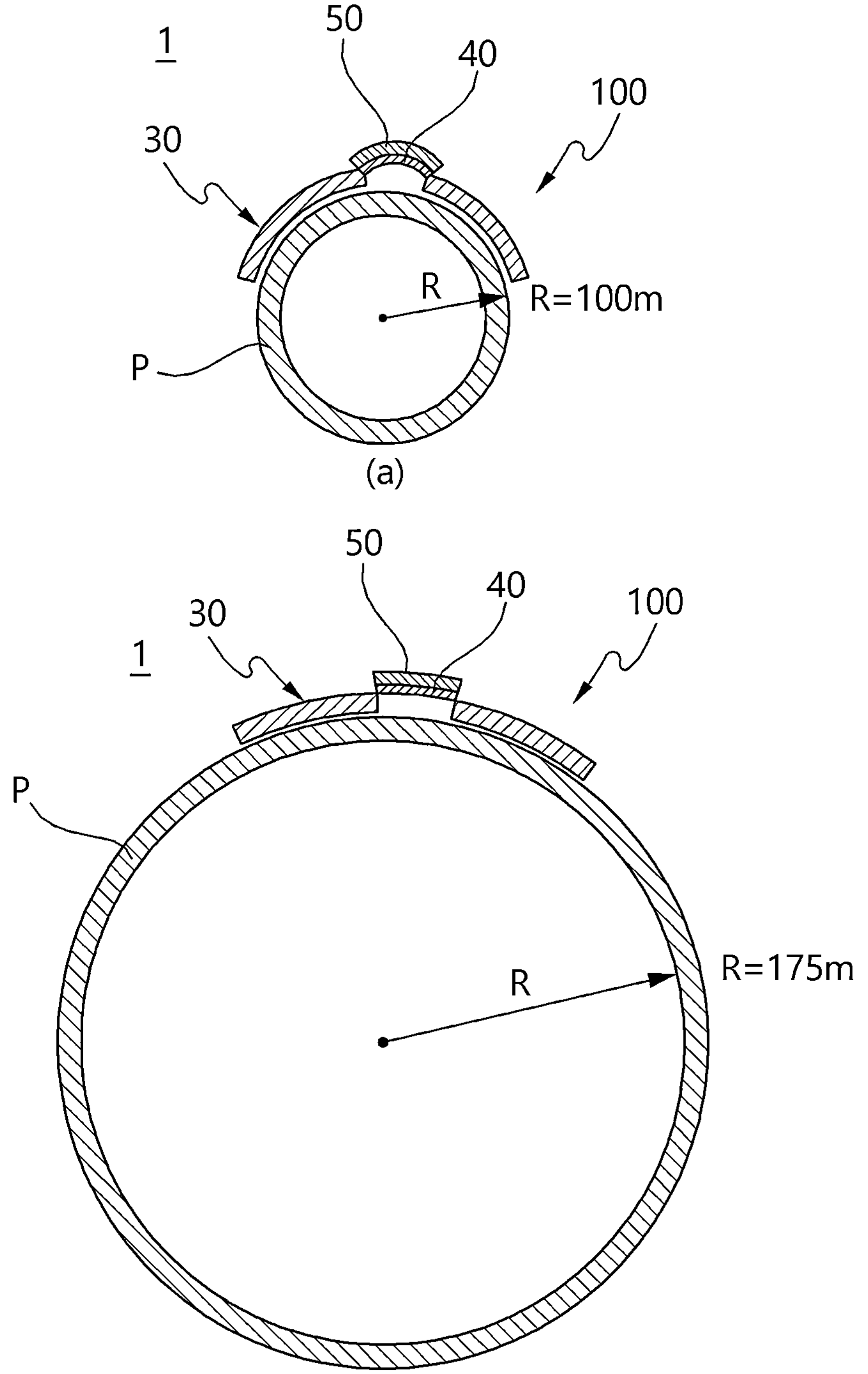
FIG. 7 is a view exemplarily illustrating a method of measuring a radius of a test target by using the image-capturing apparatus including the detector according to the embodiment of the present invention.

FIG. 7 is a view exemplarily illustrating a method of measuring a radius of the test target P by using the image-capturing apparatus 1 including the detector 100 according to the embodiment of the present invention.

With reference to FIG. 2, the image-capturing apparatus 1 of the present invention may further include a radius measurement part 4 configured to calculate a radius R or curvature of the test target P by using a resistance value of the bending sensor 40 provided in the detector 100 when the detector 100 is tightly attached to the test target P and bent. The radius measurement part 4 may be included in the second part 20 or provided outside the detector 100, and the radius measurement part 4 may be connected to the detector 100 in a wireless or wired manner.

In this case, the control part 24 may acquire a resistance value of the bending sensor 40 when the first part 10 is bent, and the radius measurement part 4 may acquire the resistance value of the bending sensor 40 by means of communication with the control part 24.

As illustrated in FIGS. 2 and 7, when the first part 10 is tightly attached to the test target P, the first part 10 and the bending sensor 40 are bent in accordance with the radius R of the test target P. In this case, in case that the radius R of the test target P to be imaged may be known, a position and size of a crack may be accurately recognized during image processing on the test target P.

In particular, when the radius R of the test target P to be imaged is accurately acquired in case that the radioactive ray generation part 3 is positioned outside the test target P, as illustrated in part (a) of FIG. 2, it is possible to correct an image distortion, which may occur during the process of acquiring an image of the test target P, or estimate an accurate thickness of a crack formed in the test target P.

In this case, the bending sensor 40 may be bent to a large degree when the test target P has a small radius R, and the bending sensor 40 may be bent to a small degree when the test target P has a large radius R.

As exemplarily shown in Table 1, the radius measurement part 4 may measure in advance resistance values of the bending sensor 40 in accordance with the radii R of the test target P and map the resistance values of the bending sensor 40. Meanwhile, Table 1 exemplarily shows the radii R of the test target, but curvatures of the first part 10 of the detector 100 may be mapped together with the resistance values of the bending sensor 40.

Table 1 below is a data table showing the resistance values of the bending sensor 40 in accordance with the radii R of the test target P measured in advance by the radius measurement part 4. However, the resistance values of the bending sensor 40 in accordance with the radii R in Table 1 are illustrative, and the resistance value may decrease as the radius increases in accordance with the properties of the bending sensor 40.

TABLE 1

| Radius (mm) of test target | Resistance value (kΩ) of bending sensor |
|---|---|
| 50 | 25 |
| 100 | 50 |
| 150 | 75 |
| 200 | 100 |

The radius measurement part 4 may not measure the resistance values of the bending sensor 40 in accordance with all the radii R of the test target P. As exemplarily shown in Table 1, the radius measurement part 4 may measure resistance values of the bending sensor 40 only for particular radii (e.g., 50 mm, 100 mm, 150 mm, and 200 mm) and then estimate the remaining intermediate values (e.g., by means of linear interpolation or the like). For example, the number of intermediate values to be estimated may vary depending on the configurations and unique properties of the bending sensor 40 and the test target P.

Table 2 below is a data table showing the resistance values of the bending sensor 40 in accordance with the radii R of the test target P estimated by the radius measurement part 4 by using the data shown in Table 1.

TABLE 2

| Radius (mm) of test target | Resistance value (kΩ) of bending sensor |
|---|---|
| 50 | 25 |
| 75 | 37.5 |
| 100 | 50 |
| 125 | 62.5 |
| 150 | 75 |
| 175 | 87.5 |
| 200 | 100 |

For example, the radius measurement part 4 may estimate the resistance value of the bending sensor 40 as 37.5 kΩ, when the radius R of the test target P is 75 mm, by means of linear interpolation using a resistance value of 25 kΩ of the bending sensor 40, when the radius R of the test target P is 50 mm, and a resistance value of 50 kΩ of the bending sensor 40 when the radius R of the test target P is 100 mm. Likewise, the radius measurement part 4 may estimate the resistance value of the bending sensor 40 as 62.5 kΩ when the radius R of the test target P is 125 mm, and the radius measurement part 4 may estimate the resistance value of the bending sensor 40 as 87.5 kΩ when the radius R of the test target P is 175 mm.

Meanwhile, if a resistance value of the bending sensor 40 measured by the radius measurement part 4 is a value that is not present in the data table of Table 2, a value close to a value shown in Table 2 may be selected by rounding up or down the value shown in Table 2.

In the example illustrated in part (a) of FIG. 7, the radius measurement part 4 may determine the radius R of the test target P as 100 mm in case that the resistance value of the bending sensor 40, which is obtained when the detector 100 is tightly attached to the test target P and bent, is 50 kΩ.

Meanwhile, in the example illustrated in part (b) of FIG. 7, the radius measurement part 4 may determine the radius R of the test target P as 175 mm in case that the resistance value of the bending sensor 40, which is obtained when the detector 100 is tightly attached to the test target P and bent, is 87.5 kΩ.

Figure 8:
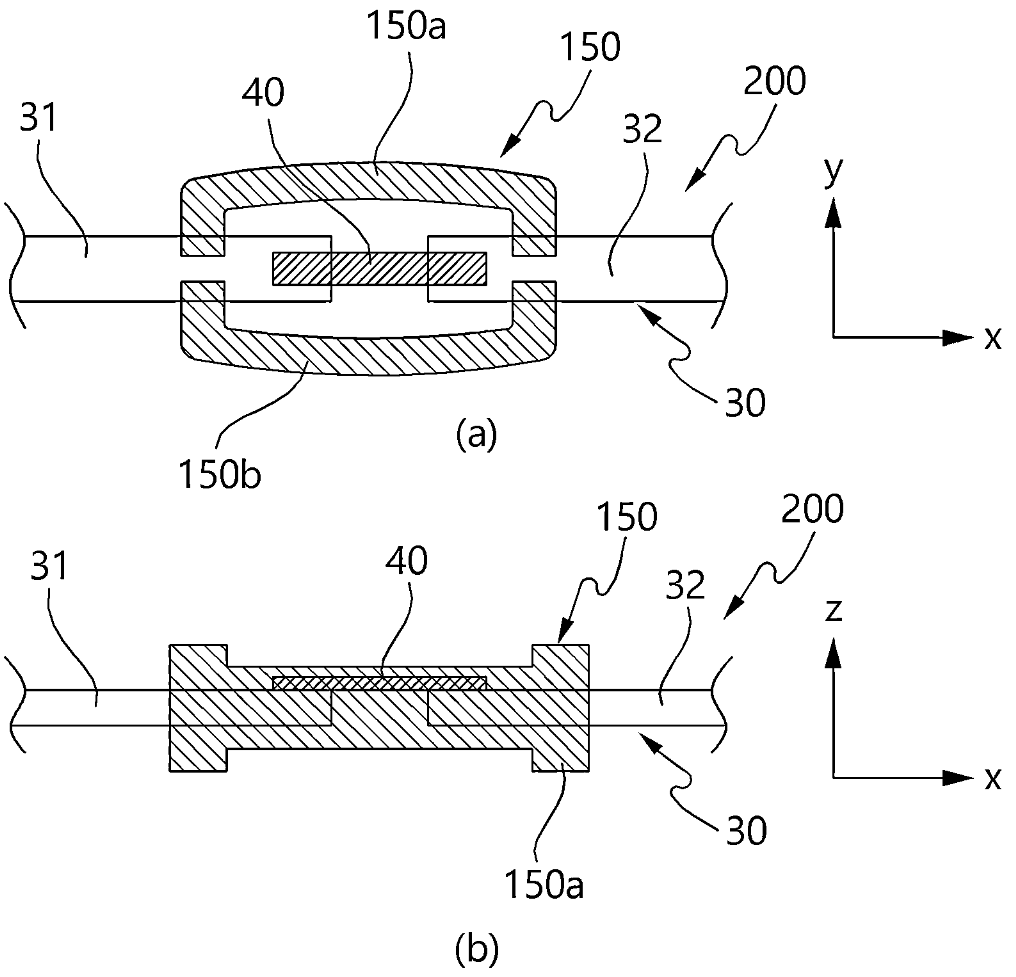
FIG. 8 is a view illustrating an exemplary shape of a detector according to a second embodiment of the present invention.

FIG. 8 is a view illustrating an exemplary shape of a detector 200 according to a second embodiment of the present invention. In this case, part (a) of FIG. 8 is a view illustrating the detector 200 according to the second embodiment of the present invention when viewed from above, and part (b) of FIG. 8 is a view illustrating the detector 200 according to the second embodiment of the present invention when viewed from the lateral side. In addition, FIG. 8 does not illustrate the conductive wire part 42 and the coupling member 60.

The detector 200 according to the second embodiment of the present invention does not greatly differ in configuration from the detector 100 illustrated in FIGS. 3 to 5, except for a shape of a connection member 150.

Therefore, regarding the detector 200 according to the second embodiment, a detailed description of the components identical to the components of the detector 100 illustrated in FIGS. 3 to 5 will be omitted, and only the difference will be described in detail.

With reference to FIG. 8, in the detector 200 according to the second embodiment, the connection member 150 may be formed to surround the bending sensor 40 on the horizontal plane.

In detail, the connection member 150 includes a first connection portion **150*a* coupled to the reinforcement part 30 on the horizontal plane, and a second connection portion 150*b* coupled to the reinforcement part 30 so as to be symmetric together with the first connection portion 150***a* with respect to the second direction with the bending sensor 40 interposed therebetween on the horizontal plane.

In the embodiment, like the connection member 50 illustrated in FIGS. 3 and 4, the connection member 150 may be provided as a pair of connection members 150 formed in the second direction perpendicular to the first direction with the detection panel 14 interposed therebetween. However, the present invention is not limited thereto. Only the single connection member 150 may be provided in the first direction to connect the first reinforcement member 31 and the second reinforcement member 32.

In the embodiment, as illustrated in FIG. 8, one of the connection members 150 includes the first connection portion 150*a* coupled to the first reinforcement member 31 and the second reinforcement member 32 of the reinforcement part 30 on the horizontal plane, and the second connection portion 150*b* coupled to the first reinforcement member 31 and the second reinforcement member 32 of the reinforcement part 30 and disposed symmetrically together with the first connection portion 150*a* with respect to the second direction with the bending sensor 40 interposed therebetween on the horizontal plane.

In the detector 200 according to the second embodiment of the present invention, the connection member 150 is bent in the same way as the first part 10 and the bending sensor 40 when the first part 10 and the bending sensor 40 are bent. The connection member 150 connects the divided parts of the reinforcement part 30, on which the bending sensor 40 is disposed, and is formed to surround the bending sensor 40 on the horizontal plane, which may prevent damage to the bending sensor 40 when the first part 10 is bent.

Figure 9:
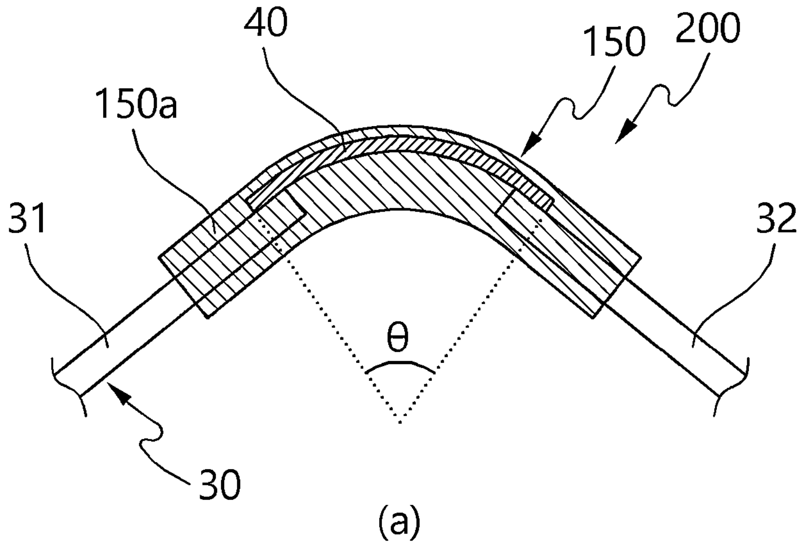
FIG. 9 is a view illustrating states made before and after the detector according to the second embodiment of the present invention is bent.
Figure 9:
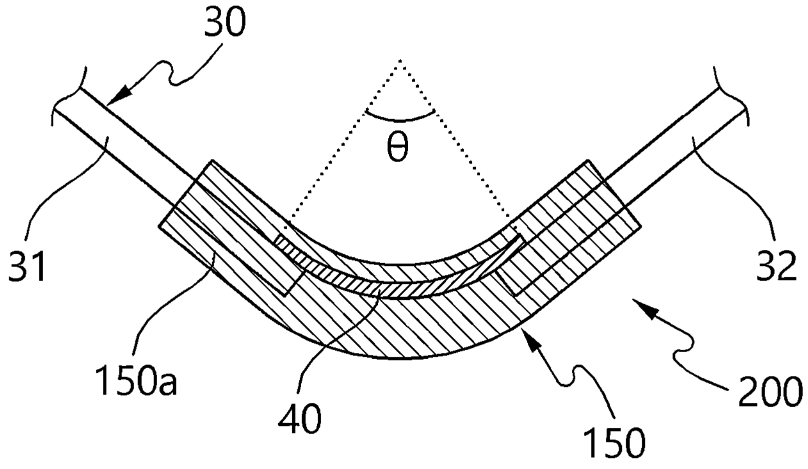

FIG. 9 is a view illustrating a state in which the detector 200 according to the second embodiment of the present invention is bent. In this case, FIG. 9 does not illustrate the conductive wire part 42 and the coupling member 60.

In case that the bending sensor 40 and the connection member 150 are bent in one direction (convexly upward) when the first part 10 is bent as in the state in part (a) of FIG. 9, the divided parts (e.g., the first reinforcement member 31, the second reinforcement member 32, and the like) of the reinforcement part 30 may support the bending sensor 40 and the connection member 150 against the bending of the bending sensor 40 and the connection member 150.

In addition, in case that the bending sensor 40 and the connection member 150 are bent (convexly downward) in a direction different from one direction when the first part 10 is bent as in the state in part (b) of FIG. 9, the divided parts (e.g., the first reinforcement member 31, the second reinforcement member 32, and the like) of the reinforcement part 30 may support the bending sensor 40 and the connection member 150 against the bending of the bending sensor 40 and the connection member 150.

Part (a) and part (b) of FIG. 9 illustrate that the bending sensor 40 and the connection member 150 are bent to a larger degree than the first and second reinforcement members 31 and 32. However, the first and second reinforcement members 31 and 32 may be bent to a larger degree than the bending sensor 40 or the connection member 150 in accordance with material properties of the first and second reinforcement members 31 and 32, the bending sensor 40, and the connection member 150.

As illustrated in FIG. 9, in the detector 200 according to the second embodiment of the present invention, the connection member 150 is formed to surround the bending sensor 40 on the horizontal plane, such that the control part 24 may acquire an accurate resistance value of the bending sensor 40 not only in a case in which the bending sensor 40 is bent convexly upward based on FIG. 9 but also in a case in which the bending sensor 40 is bent convexly downward.

For example, in the detector 200 according to the second embodiment of the present invention, an angle between the ends of the bending sensor 40 with respect to a radial center of the test target P may be θ in case that the first part 10 is bent in one direction or a direction different from one direction.

Figure 10:
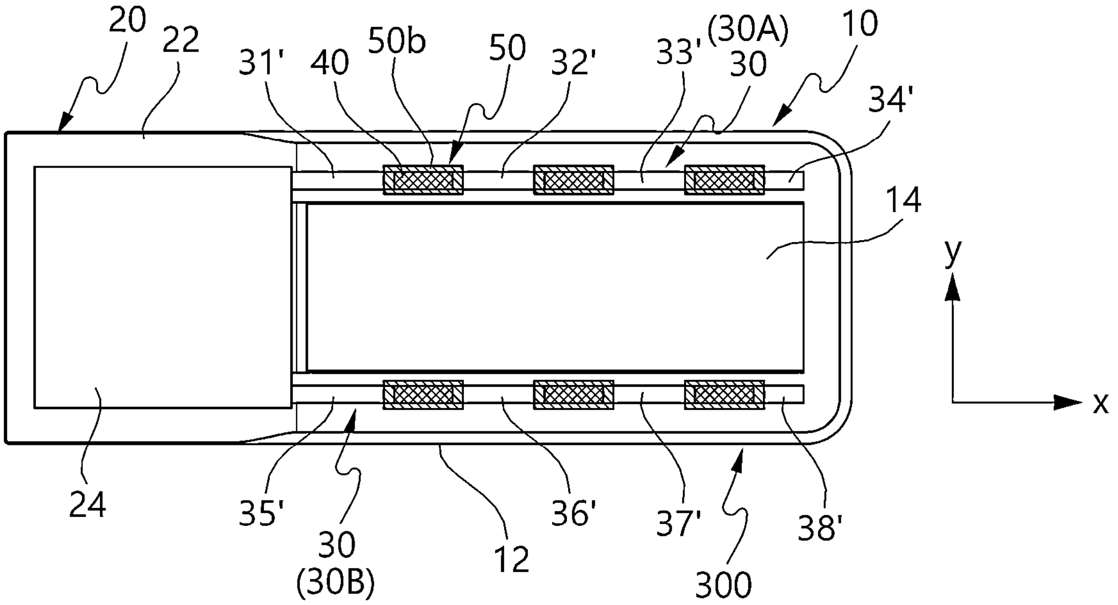
FIG. 10 is a view illustrating an exemplary shape of a detector according to a third embodiment of the present invention.
Figure 10:
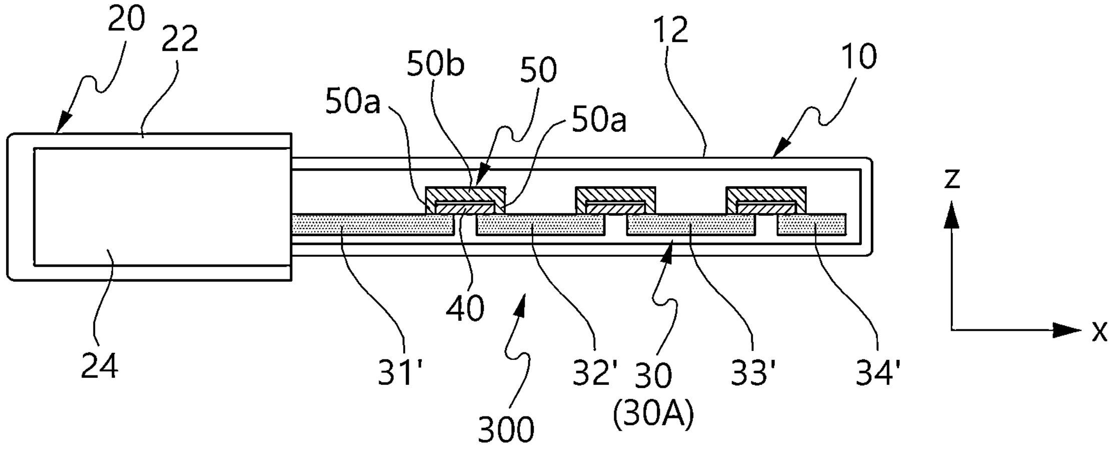

FIG. 10 is a view illustrating an exemplary shape of a detector 300 according to a third embodiment of the present invention. In this case, part (a) of FIG. 10 is a view illustrating an interior of the detector 300 according to the third embodiment when projected from above, and part (b) of FIG. 10 is a view illustrating the interior of the detector 300 according to the third embodiment when projected laterally. In addition, FIG. 10 does not illustrate the conductive wire part 42 and the coupling member 60.

The detector 300 according to the third embodiment of the present invention is characterized in that the reinforcement part 30 is divided into a plurality of parts in the first direction, and the bending sensor 40 is also provided as a plurality of bending sensors 40 provided in the first direction between the divided parts of the reinforcement part 30.

Therefore, regarding the detector 300 according to the third embodiment, a detailed description of the components identical to the components of the detector 100 illustrated in FIGS. 3 to 5 will be omitted, and only the difference will be described in detail.

FIG. 10 illustrates the detector 300 according to the third embodiment configured such that the reinforcement part 30 is divided into four parts. In the embodiment of the present invention, the number of divided parts of the reinforcement part 30 is not limited. As illustrated in FIG. 3, the reinforcement part 30 may be divided into two parts. As illustrated in FIG. 10, the reinforcement part 30 may be divided into four parts, three parts, or more than four parts.

In the embodiment, in the detector 300 according to the third embodiment, as illustrated in FIG. 10, the reinforcement parts 30 may be provided as the pair of the first reinforcement part 30A and the second reinforcement part 30B provided at the two opposite sides of the detection panel 14 with the detection panel 14 interposed therebetween on the horizontal plane. However, in the embodiment of the present invention, only any one of the first reinforcement part 30A and the second reinforcement part 30B of the reinforcement parts 30 may be provided.

In the embodiment, the first reinforcement part 30A includes a first reinforcement member 31', a second reinforcement member 32', a third reinforcement member 33', and a fourth reinforcement member 34' divided in the first direction. In addition, the second reinforcement part 30B includes a fifth reinforcement member 35', a sixth reinforcement member 36', a seventh reinforcement member 37', and an eighth reinforcement member 38' divided in the first direction.

As exemplarily illustrated in FIG. 10, the bending sensors 40 may be provided between the first reinforcement member 31' and the second reinforcement member 32', between the second reinforcement member 32' and the third reinforcement member 33', and between the third reinforcement member 33' and the fourth reinforcement member 34' of the first reinforcement part 30A. In addition, the bending sensors 40 may be provided between the fifth reinforcement member 35' and the sixth reinforcement member 36', between the sixth reinforcement member 36' and the seventh reinforcement member 37', and between the seventh reinforcement member 37' and the eighth reinforcement member 38' of the second reinforcement part 30B.

With reference to FIG. 10, in the detector 300 according to the third embodiment, the plurality of connection members 50 may be formed while corresponding in number to the bending sensor 40 and formed to partially surround the bending sensors 40 on the vertical plane. The configurations of the bending sensor 40 and the connection member 50 of the third embodiment may be implemented by adopting the configurations of the bending sensor 40 and the connection member 50 described with reference to FIGS. 3 and 4. In addition, the connection configuration between the bending sensor 40 and the reinforcement member in the third embodiment may be implemented by adopting the configuration described with reference to FIG. 6.

Meanwhile, in the detector 300 according to the third embodiment, the reinforcement part 30 is divided into the plurality of parts in the first direction, and the plurality of bending sensors 40 are also provided to correspond to the plurality of parts of the reinforcement part 30. Therefore, it is possible to measure various bent states in comparison with the detector 100 illustrated in FIGS. 3 to 5 in case that the bending sensor 40 and the connection member 50 are bent when the first part 10 is bent.

In detail, in the detector 300 according to the third embodiment, the plurality of bending sensors 40 may be provided in the first direction. Therefore, for example, the plurality of test targets P having different radii R may be disposed on the lower portion of the detector 300, and the detector 300 may be tightly attached to the test targets P having the different radii R, such that the radius measurement part 4 may easily determine the radii R of the test targets P having the different radii R.

Figure 11:
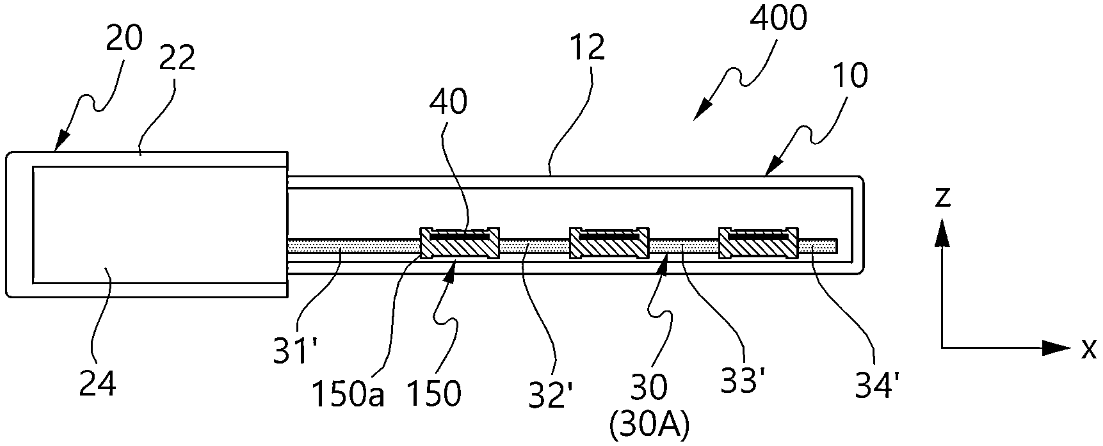
FIG. 11 is a view illustrating an exemplary shape of a detector according to a fourth embodiment of the present invention.
Figure 11:
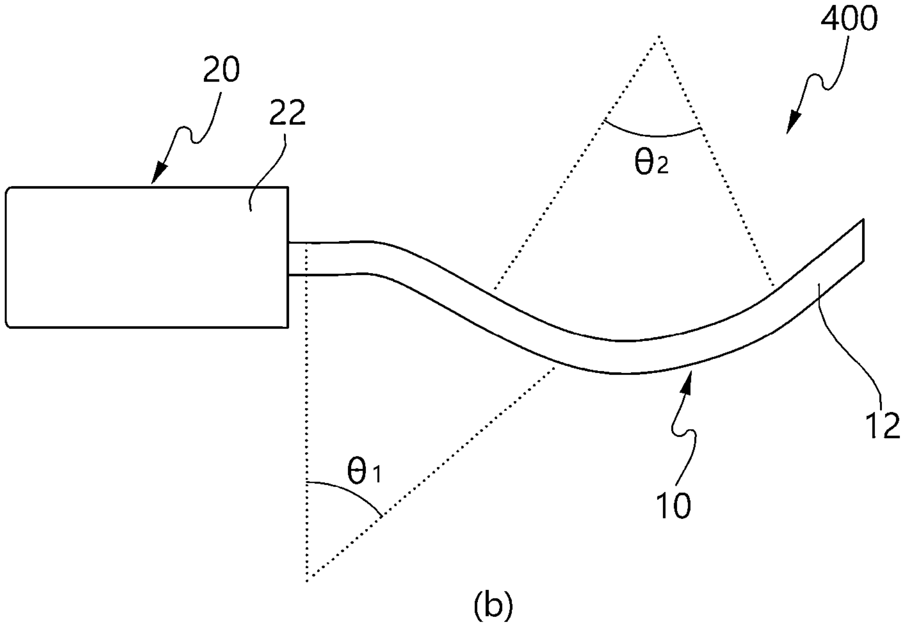

FIG. 11 is a view illustrating an exemplary shape of a detector 400 according to a fourth embodiment of the present invention. In this case, part (a) of FIG. 11 is a view illustrating a detector 400 according to the fourth embodiment of the present invention when projected laterally, and part (b) of FIG. 11 is a view illustrating a state in which the detector 400 according to the fourth embodiment of the present invention is bent.

In addition, FIG. 11 does not illustrate the conductive wire part 42 and the coupling member 60.

The detector 400 according to the fourth embodiment of the present invention does not greatly differ in configuration from the detector 200 according to the second embodiment illustrated in FIG. 8, except that the reinforcement part 30 is divided into a plurality of parts in the first direction, and the bending sensor 40 is also provided as a plurality of bending sensors 40 provided in the first direction between the divided parts of the reinforcement part 30.

Therefore, regarding the detector 400 according to the fourth embodiment, a detailed description of the components identical to the components of the detector 200 according to the second embodiment illustrated in FIG. 8 will be omitted, and only the difference will be described in detail.

With reference to FIG. 11, like the detector 300 according to the third embodiment illustrated in FIG. 10, in the detector 400 according to the fourth embodiment, the reinforcement part 30 may be divided into the plurality of parts in the first direction, and the bending sensors 40 may be provided on the divided parts.

In detail, like the detector 300 according to the third embodiment illustrated in FIG. 10, the detector 400 according to the fourth embodiment may be configured such that the reinforcement parts 30 include the first reinforcement part 30A including the first reinforcement member 31', the second reinforcement member 32', the third reinforcement member 33', and the fourth reinforcement member 34', and the second reinforcement part 30B including the fifth reinforcement member 35', the sixth reinforcement member 36', the seventh reinforcement member 37', and the eighth reinforcement member 38'. However, in the fourth embodiment, only any one of the first reinforcement part 30A and the second reinforcement part 30B of the reinforcement parts 30 may be provided.

In the fourth embodiment, the configurations of the bending sensor 40 and the connection member 150 provided on the connection portion between the reinforcement members may be implemented by adopting the configurations described with reference to FIG. 8.

Meanwhile, in the detector 400 according to the fourth embodiment, the reinforcement part 30 is divided into the plurality of parts in the first direction, and the plurality of bending sensors 40 are also provided to correspond to the plurality of parts of the reinforcement part 30. Therefore, it is possible to measure various bent states in comparison with the detector 200 according to the second embodiment of the present invention illustrated in FIG. 8 and the detector 300 according to the third embodiment of the present invention illustrated in FIG. 10 in case that the bending sensor 40 and the connection member 150 are bent in one direction or a direction different from one direction (deformed convexly upward or convexly downward based on FIG. 11) when the first part 10 is bent.

In detail, in the detector 400 according to the fourth embodiment, the connection member 150 may be formed to surround the bending sensor 40 on the horizontal plane, and the plurality of bending sensors 40 may be provided in the first direction. Therefore, for example, the plurality of test targets P having radii R may be disposed on the upper and lower portions of the detector 400, and the detector 400 may be tightly attached to the test targets P having the different radii R, such that the radius measurement part 4 may easily determine the radii R of the test targets P having the different radii R in response to the bending of the detector 400 in the two directions (one direction and the direction different from one direction).

For example, in the detector 200 according to the fourth embodiment of the present invention, an angle between the ends of the bending sensor 40 with respect to the radial center of the test target P may be $\theta_1$ in case that the first part 10 is bent in one direction (e.g., a downward direction), and an angle between the ends of the bending sensor 40 with respect to the radial center of the test target P may be $\theta_2$ in case that the first part 10 is bent in a direction (e.g., an upward direction) different from one direction.

Figure 12:
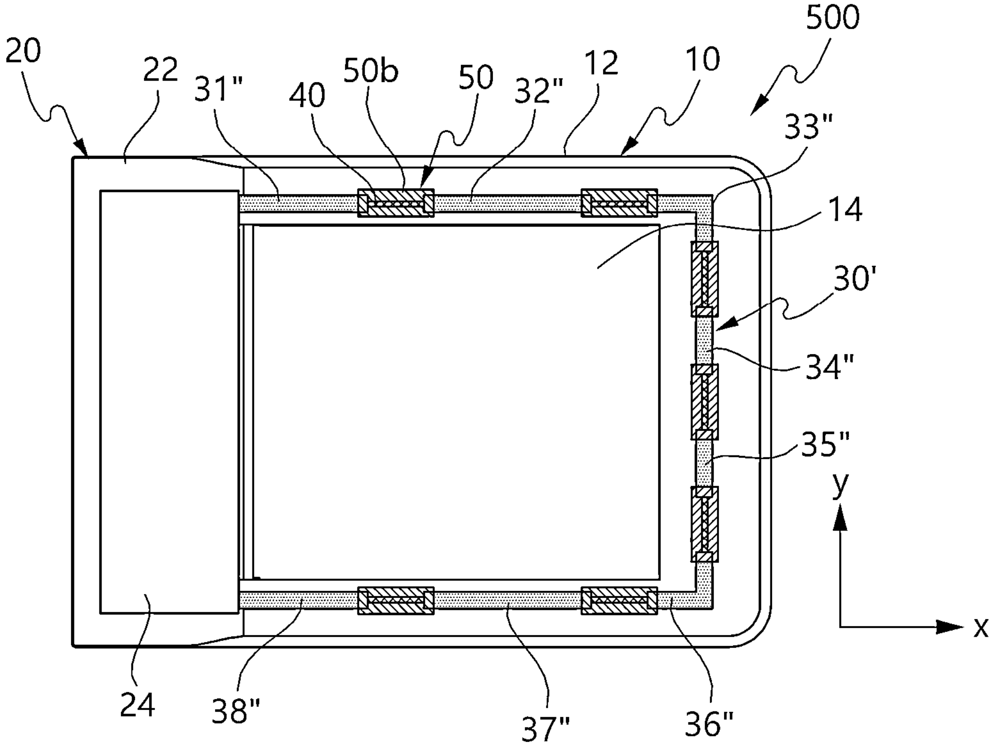
FIG. 12 is a view illustrating an exemplary shape of a detector according to a fifth embodiment of the present invention.
Figure 12:
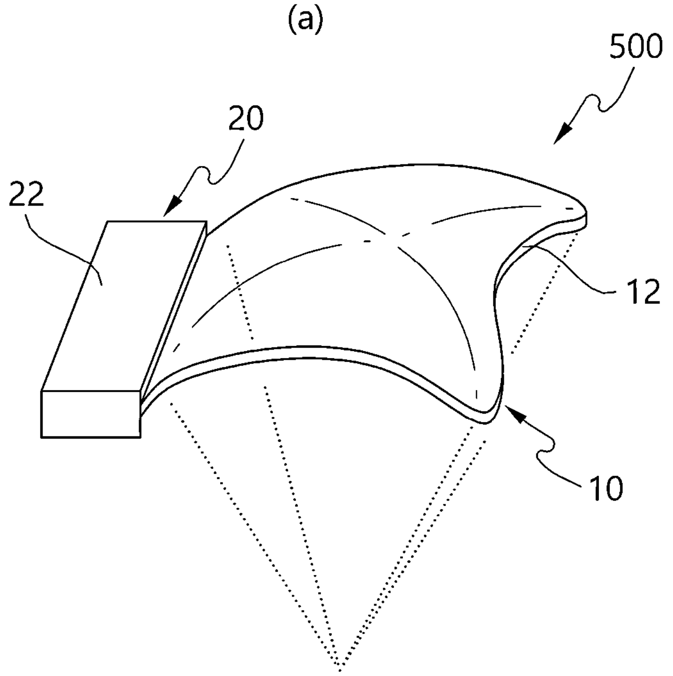

FIG. 12 is a view illustrating an exemplary shape of a detector 500 according to a fifth embodiment of the present invention. In this case, part (a) of FIG. 12 is a view illustrating the detector 500 according to the fifth embodiment of the present invention when projected from above, and part (b) of FIG. 12 is a view illustrating a state in which the detector 500 according to the fifth embodiment of the present invention is bent.

In addition, FIG. 12 does not illustrate the conductive wire part 42 and the coupling member 60.

The detector 500 according to the fifth embodiment of the present invention does not differ in configuration from the detector 300 according to the third embodiment illustrated in FIG. 10, except that the reinforcement part 30 is divided into a plurality of parts in the first and second directions, and the bending sensor 40 is also provided as a plurality of bending sensors 40 provided in the first and second directions between the divided parts of the reinforcement part 30.

Therefore, regarding the detector 500 according to the fifth embodiment, a detailed description of the components identical to the components of the detector 300 according to the third embodiment illustrated in FIG. 10 will be omitted, and only the difference will be described in detail.

With reference to FIG. 12, in the detector 500 according to the fifth embodiment, a reinforcement part 30' may be disposed outside the detection panel 14 and surround at least a part of the detection panel 14 on the horizontal plane.

More specifically, in the detector 500 according to the fifth embodiment, as illustrated in FIG. 12, the reinforcement part 30' may be disposed to surround at least a part of the detection panel 14 on the horizontal plane and divided into a plurality of parts in the first and second directions.

In addition, in the detector 500 according to the fifth embodiment, the plurality of bending sensors 40 may also be provided in the first and second directions between the divided parts of the reinforcement part 30'.

In detail, as exemplarily illustrated in FIG. 12, the reinforcement part 30' may be divided into a first reinforcement member 31", a second reinforcement member 32", a third reinforcement member 33", a fourth reinforcement member 34", a fifth reinforcement member 35", a sixth reinforcement member 36", a seventh reinforcement member 37", and an eighth reinforcement member 38".

For example, the first reinforcement member 31", the second reinforcement member 32", and the third reinforcement member 33" may be divided in the first direction, the third reinforcement member 33", the fourth reinforcement member 34", the fifth reinforcement member 35", and the sixth reinforcement member 36" may be divided in the second direction, and the sixth reinforcement member 36", the seventh reinforcement member 37", and the eighth reinforcement member 38" may be divided in the first direction. In the embodiment, as illustrated in part (a) of FIG. 12, the first to eighth reinforcement parts 31", 32", 33", 34", 35", 36", 37", and 38" may be provided in a "⊏" shape that surrounds the detection panel 14.

In addition, as exemplarily illustrated in FIG. 12, the bending sensors 40 may be provided in the first direction between the first reinforcement member 31" and the second reinforcement member 32", between the second reinforcement member 32" and the third reinforcement member 33", between the sixth reinforcement member 36" and the seventh reinforcement member 37", and between the seventh reinforcement member 37" and the eighth reinforcement member 38", and the bending sensors 40 may be provided in the second direction between the third reinforcement member 33" and the fourth reinforcement member 34", between the fourth reinforcement member 34" and the fifth reinforcement member 35", and between the fifth reinforcement member 35" and the sixth reinforcement member 36".

For example, although not illustrated in detail, in the detector 500 of the fifth embodiment, the bending sensor 40 may be coupled to the reinforcement part 30' by means of the above-mentioned coupling member 60.

In addition, the configurations of the connection members 50 and 150, which surround the bending sensors 40, and the coupling configuration between the reinforcement members illustrated in FIG. 6, and the connection configuration of the bending sensor 40 may also be applied to the fifth embodiment.

In the detector 500 according to the fifth embodiment, as illustrated in FIG. 12, the reinforcement part 30' is divided into the plurality of parts in both the first and second directions, and the plurality of bending sensors 40 are also provided in the first and second directions to correspond to the plurality of parts of the reinforcement part 30'. Therefore, it is possible to measure further three-dimensional bent states of the detector 500 with respect to the test target P in comparison with the detector 300 illustrated in FIG. 10 in case that the bending sensor 40 and the connection member 50 are bent in one direction (e.g., the downward direction) when the first part 10 is bent.

In detail, in the detector 500 according to the fifth embodiment, the plurality of bending sensors 40 may be provided in both the first and second directions. Therefore, for example, the test target P having a spherical shape may be disposed on the lower portion of the detector 500, and the detector 500 may be tightly attached to the test target P, such that the radius measurement part 4 may easily determine the radius R of the test target P having a spherical shape.

According to the detectors 100, 200, 300, 400, and 500 of the present invention, the radius R of the test target P to be imaged may be accurately recognized when the first part 10 made of an elastic material is tightly attached to the test target P and the bending sensor 40 is bent. Therefore, it is possible to correct an image distortion, which may occur during the process of acquiring an image of the test target P, or estimate an accurate thickness of a crack formed in the test target P.

In addition, according to the detectors 100, 200, 300, 400, and 500 of the present invention, a degree to which the detector is bent may be detected by the bending sensor 40, such that a degree to which the detector is deformed may be easily determined.

The above-mentioned description has been exemplarily described in which in case that the reinforcement parts 30 are provided as the pair of reinforcement parts, i.e., the first reinforcement part 30A and the second reinforcement part 30B at two opposite sides of the detection panel 14 with the detection panel 14 interposed therebetween, the x-direction positions, at which the bending sensors 40 are provided on the first reinforcement part 30A and the second reinforcement part 30B, are identical to one another. However, in the embodiment of the present invention, the x-direction positions, at which the bending sensors 40 are provided on the first reinforcement part 30A and the second reinforcement part 30B, may be different from one another (e.g., the x-direction positions are alternately disposed). Therefore, it is possible to increase the number of x-direction positions for detecting the radius of the test target or the curvature of the detector and perform the more precise detection.

Figure 13:
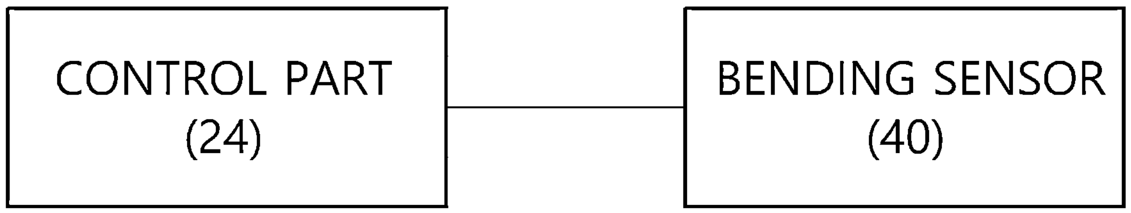
FIG. 13 is a block diagram illustrating a control part and a bending sensor of the detector and the image-capturing apparatus including the same according to the embodiment of the present invention.

FIG. 13 is a block diagram illustrating the control part and the bending sensor of the detector and the image-capturing apparatus including the same according to the embodiment of the present invention.

As described above, the control part 24 acquires a resistance value of the bending sensor 40. When the detector 100 according to the present invention is repeatedly used for the test target P, there is a likelihood that the first part 10 surrounding the test target P may be damaged or the precision may deteriorate.

The detector and the image-capturing apparatus including the same according to the embodiment of the present invention may counting the number of uses of the detector 100 and/or predicting the usage lifespan. In the embodiment, the control part 24 may count the number of uses of the detector 100 and/or predict the durability life on the basis of the resistance value of the bending sensor 40.

Figure 14:
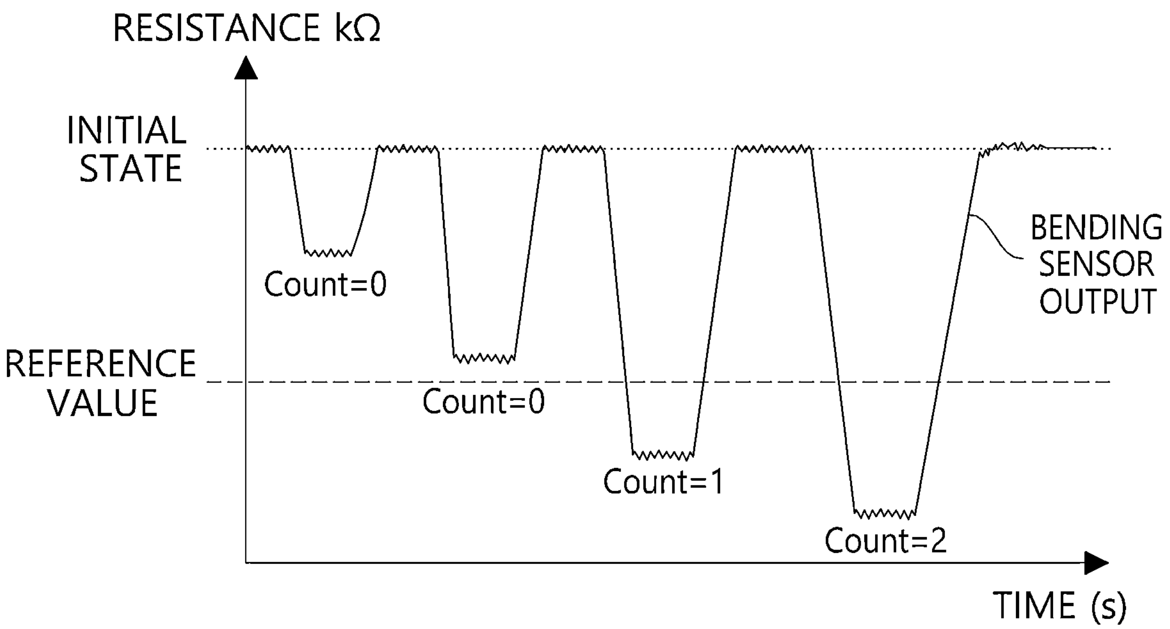
FIG. 14 is a view illustrating an example of the number of uses counted on the basis of a sensing value of a bending sensor of the detector and the image-capturing apparatus including the same according to the embodiment of the present invention.

FIG. 14 is a view illustrating an example of the number of uses counted on the basis of a sensing value of the bending sensor of the detector and the image-capturing apparatus including the same according to the embodiment of the present invention.

In case that the detector 100 is mounted on the periphery of the test target P, the resistance value of the bending sensor 40 changes when the first part 10 of the detector 100 is bent. The control part 24 may receive the resistance value of the bending sensor 40, and the control part 24 may increase the number of uses of the detector 100 when the resistance value of the bending sensor 40 exceeds a reference value. FIG. 14 illustrates a case in which the resistance value decreases as the bending sensor 40 is bent. As shown in Table 3, in case that the resistance value of the bending sensor 40 is equal to or smaller than the reference value (75 kΩ), the number of uses may be recognized and increased (counted) (the number of uses may be an integer of 0 or more). FIG. 14 illustrates that the count is increased by one in case that the resistance value of the bending sensor 40 is smaller than the reference value.

TABLE 3

| Radius (mm) of test target | Resistance value (kΩ) of bending sensor | Recognition of number of uses |
|---|---|---|
| 50 | 25 | o |
| 75 | 37.5 | o |
| 100 | 50 | o |
| 125 | 62.5 | o |
| 150 | 75 | o |
| 175 | 87.5 | x |
| 200 | 100 | x |

The control part 24 may determine whether the number of uses is recognized on the basis of the change in resistance value of the bending sensor 40. In case that the number of uses is recognized, the control part 24 may increase and store the number of uses. In addition, the control part 24 may transmit the cumulative number of uses of the detector 100 to an external component through the radius measurement part 4. The reference value of the resistance value of the bending sensor 40 for recognizing the number of uses may be set in advance or set by the user. In addition, the example has been described in which the resistance value of the bending sensor 40 decreases as the bending sensor 40 is bent. However, the present invention may be applied to a case in which the resistance value of the bending sensor 40 increases as the bending sensor 40 is bent.

Figure 15:
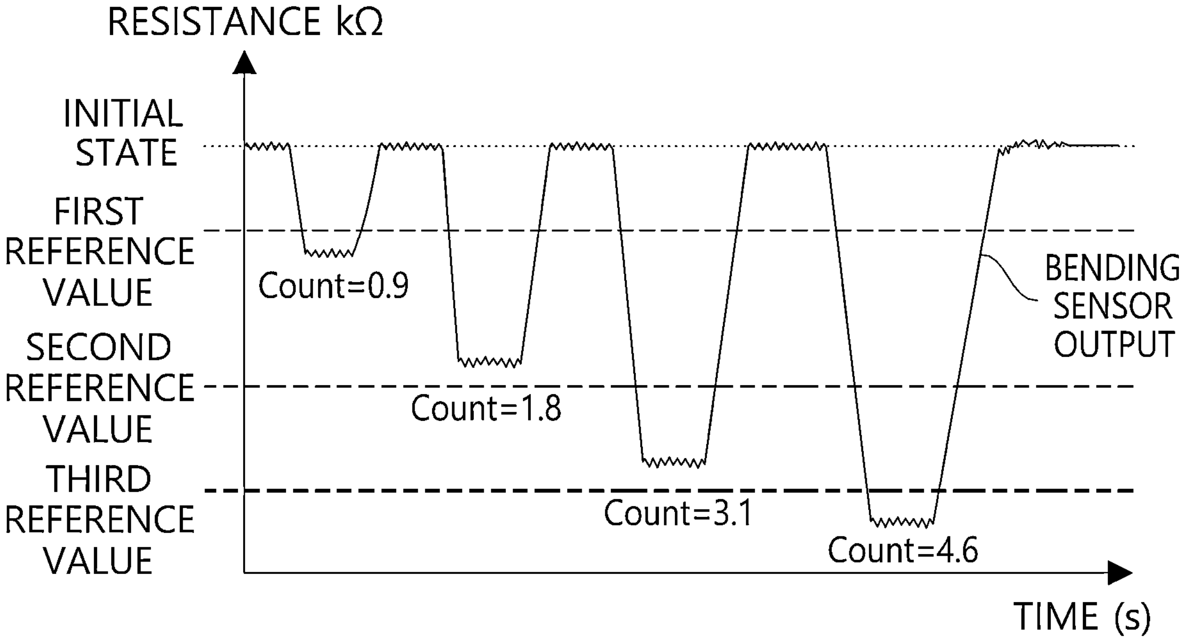
FIG. 15 is a view illustrating another example of the number of uses counted on the basis of a sensing value of the bending sensor of the detector and the image-capturing apparatus including the same according to the embodiment of the present invention.

FIG. 15 is a view illustrating another example of the number of uses counted on the basis of a sensing value of the bending sensor of the detector and the image-capturing apparatus including the same according to the embodiment of the present invention.

In FIG. 14, because the number of uses is counted only in case that the resistance value is smaller than the predetermined reference value, the number of uses may not be considered in case that the bending sensor is repeatedly used within a range that does not exceed the reference value. In order to complement this configuration, a method of imparting a weight value to the number of uses (counts) during the measurement in accordance with the resistance value of the bending sensor 40. In the embodiment, with reference to FIG. 15, the number of uses may be accumulated by adding or subtracting the number of uses or multiplying the number of uses by a weight value during the measurement in accordance with the plurality of reference values (count, the number of uses may be a real number of 0 or more). In the example in FIG. 15, the count may increase by 0.9 for the first and second times, increase by 1.3 for the third time, and increase by 1.5 for the fourth time, as illustrated in FIG. 15, when a first reference value is set to 100 kΩ, a second reference value is set to 50 kΩ, a third reference value is set to 25 kΩ, a weight value of a count between the first reference value and the second reference value is set to 0.9, a count between the second reference value and the third reference value is set to 1.3, and a count equal to or larger than the third reference value is set to 1.5. Therefore, the cumulative number of uses is 4.6 after the fourth use of the detector 100 is completed.

Alternatively, as illustrated in Table 4, information on the number of uses in accordance with the resistance value of the bending sensor 40 may be stored in the form of a lookup table, and the number of uses in accordance with the actual resistance value of the bending sensor 40 may be calculated. In addition, in case that the lookup table is used, the interpolation may be applied when the resistance value of the bending sensor is not clearly shown in the lookup table.

TABLE 4

| Radius (mm) of test target | Resistance value (kΩ) of bending sensor | Number of uses |
|---|---|---|
| 50 | 25 | 1.5 |
| 75 | 37.5 | 1.4 |
| 100 | 50 | 1.3 |
| 125 | 62.5 | 1.2 |
| 150 | 75 | 1.1 |
| 175 | 87.5 | 1.0 |
| 200 | 100 | 0.9 |

The control part 24 may accumulate the number of uses from the initial use of the detector 100, provide information on the cumulative number of uses, and/or information on the remaining number of available uses. The above description is simply given for illustratively describing the technical spirit of the present invention, and those skilled in the art to which the present invention pertains will appreciate that various modifications, changes, and substitutions are possible without departing from the essential characteristic of the present invention. Accordingly, the embodiments disclosed in the present invention and the accompanying drawings are intended not to limit but to describe the technical spirit of the present invention, and the scope of the technical spirit of the present invention is not limited by the embodiments and the accompanying drawings. The protective scope of the present invention should be construed based on the following claims, and all the technical spirit in the equivalent scope thereto should be construed as falling within the scope of the present invention.

The invention claimed is:

1. A detector, comprising:

a first part including a first housing made of an elastic material, and a detection panel disposed in the first housing;

a second part connected to the first part and including a second housing made of an inelastic material or a material having higher rigidity than the elastic material of the first housing;

a reinforcement part disposed outside the detection panel in a first direction or disposed to surround at least a part of the detection panel;

at least one bending sensor disposed on the reinforcement part and configured to change in resistance value as the first part is bent; and a control part disposed in the second part, disposed in the second housing, and connected to the detection panel, wherein the control part accumulates a number of uses of the detector by using a resistance value of said at least one bending sensor.

2. The detector of claim 1, wherein the reinforcement part is divided into at least two parts in the first direction.

3. The detector of claim 2, wherein the reinforcement part comprises a first reinforcement part and a second reinforcement part disposed in the first direction with the detection panel interposed therebetween.

4. The detector of claim 3, wherein a position in the first direction of one of said at least one bending sensor disposed on the first reinforcement part and a position in the first direction of another of said at least one bending sensor disposed on the second reinforcement part are different from each other.

5. The detector of claim 2, wherein said at least one bending sensor is disposed between said at least two parts of the reinforcement part.

6. The detector of claim 5, wherein said at least one bending sensor is disposed in a direction in which said at least two parts of the reinforcement part are disposed.

7. The detector of claim 5, wherein two opposite ends of said at least one bending sensor are fixed to ends of said at least two parts of the reinforcement part.

8. The detector of claim 5, further comprising:

a connection member configured to connect said at least two parts of the reinforcement part and to surround at least a part of said at least one bending sensor.

9. The detector of claim 8, wherein the connection member comprises:

a vertical connection portion coupled perpendicular to the first direction; and a horizontal connection portion connected to the vertical connection portion and disposed in the first direction.

10. The detector of claim 8, wherein the connection member comprises:

a first connection portion configured to connect said at least two parts of the reinforcement part in one direction of said at least one bending sensor with said at least one bending sensor interposed between said at least two parts of the reinforcement part; and a second connection portion configured to connect said at least two parts of the reinforcement part in another direction of said at least one bending sensor.

11. The detector of claim 1, wherein the reinforcement part is disposed over at least a part of the first housing and at least a part of the second housing.

12. The detector of claim 1, wherein the reinforcement part comprises a pair of horizontal reinforcement members formed symmetrically on a same plane as or a plane parallel to the detection panel, and wherein said at least one bending sensor is disposed between the pair of horizontal reinforcement members.

13. The detector of claim 12, wherein the reinforcement part has a protruding portion protruding between the pair of horizontal reinforcement members, and wherein said at least one bending sensor is coupled to the protruding portion, such that said at least one bending sensor is disposed between the pair of horizontal reinforcement members.

14. An image-capturing apparatus, which captures an image by emitting radioactive rays, the image-capturing apparatus comprising:

the detector according to claim 1; and a radius measurement part configured to calculate a radius of a test target or a curvature of the detector by using a resistance value of said at least one bending sensor disposed in the detector when the detector is tightly attached to the test target and bent.

15. The image-capturing apparatus of claim 14, wherein the control part is connected to an end of a conductive wire part connected to said at least one bending sensor along the reinforcement part.

16. The image-capturing apparatus of claim 14, further comprising:

a radioactive ray generation part configured to emit radioactive rays to the test target, wherein the radioactive ray generation part is configured to be positioned outside the test target or inside the test target.

17. The image-capturing apparatus of claim 14, wherein the control part increases the number of uses when the resistance value of said at least one bending sensor exceeds a reference value.

18. The image-capturing apparatus of claim 14, wherein the control part adjusts an amount of increase in the number of uses on a basis of the resistance value of said at least one bending sensor.

* * * * *